United States Patent
Kim et al.

(10) Patent No.: US 8,526,809 B2
(45) Date of Patent: Sep. 3, 2013

(54) ADAPTER FOR CAMERA FLASH

(75) Inventors: Myung-gyu Kim, Yongin-si (KR); Seung-tack Noh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 13/271,487

(22) Filed: Oct. 12, 2011

(65) Prior Publication Data
US 2012/0189292 A1    Jul. 26, 2012

(30) Foreign Application Priority Data
Jan. 25, 2011  (KR) .................. 10-2011-0007319

(51) Int. Cl.
*G03B 15/03* (2006.01)
(52) U.S. Cl.
USPC ............................................. 396/198
(58) Field of Classification Search
USPC ............................................. 396/198
See application file for complete search history.

(56) References Cited

U.S. PATENT DOCUMENTS

| | | | | |
|---|---|---|---|---|
| 4,187,021 A * | 2/1980 | Balser | ............ | 396/422 |
| 4,591,250 A * | 5/1986 | Woodruff | ............ | 396/50 |
| 4,666,276 A * | 5/1987 | Chan | ............ | 396/180 |
| 4,740,804 A * | 4/1988 | Shands | ............ | 396/198 |
| 5,528,325 A * | 6/1996 | Perez | ............ | 396/155 |
| 5,848,306 A * | 12/1998 | Shono | ............ | 396/198 |
| 7,623,773 B2 * | 11/2009 | Yamashita | ............ | 396/29 |
| 8,019,214 B2 * | 9/2011 | Hwang | ............ | 396/198 |
| 8,160,435 B2 * | 4/2012 | Okubo | ............ | 396/56 |
| 2011/0279661 A1 * | 11/2011 | Pan Ho | ............ | 348/61 |

* cited by examiner

*Primary Examiner* — Rodney Fuller
(74) *Attorney, Agent, or Firm* — Drinker Biddle & Reath LLP

(57) ABSTRACT

An adapter for a camera flash including: a first terminal portion corresponding to a flash terminal of a camera; a mounting portion supporting the first terminal portion and installed on the camera; an operating portion coupled to the mounting portion in a manner that allows an orientation of the operating portion to be adjusted; a second terminal portion disposed on the operating portion for an external flash to be installed thereon and electrically connected to the first terminal portion; and a connection unit disposed between the operating portion and the mounting portion and supporting the operating portion with respect to the mounting portion in a manner that allows the orientation of the operating portion to be adjusted.

12 Claims, 8 Drawing Sheets

ADAPTER FOR CAMERA FLASH

CROSS-REFERENCE TO RELATED PATENT APPLICATION

This application claims the priority benefit of Korean Patent Application No. 10-2011-0007319, filed on Jan. 25, 2011, in the Korean Intellectual Property Office, the entirety of which is incorporated herein by reference.

BACKGROUND

1. Field of the Invention

The invention relates to an adapter for a camera flash, and more particularly, to an adapter for a camera flash that allows a flash to be installed on a camera and allows an angle of a flash installed on the adapter to be adjusted.

2. Description of the Related Art

Camera flashes may be used to momentarily emit a large amount of light when cameras perform photographing operations. A camera may include a terminal called a hot shoe in order for an external flash to be installed on the camera, and an external flash in the hot shoe may be used when the camera performs a photographing operation.

An emission angle of a flash may be adjusted by rotating and tilting the flash with respect to a body of a camera. Although there are cameras currently being sold on the market that allow an emission angle to be adjusted, flashes having an angle adjustment function are large and expensive.

SUMMARY

The invention provides an adapter for a camera flash that allows a flash to be installed on a camera and allows an angle of a flash installed on the adapter to be adjusted.

The invention also provides an adapter for a camera flash that is made compact at low cost, allows a flash to be installed on a camera, and allows an angle of a flash installed on the adapter to be adjustable.

According to an aspect of the invention, there is provided an adapter for a camera flash including: a first terminal portion corresponding to a flash terminal of a camera; a mounting portion supporting the first terminal portion and being installable on the camera; an operating portion coupled to the mounting portion in a manner that allows an orientation of the operating portion to be adjusted; a second terminal portion disposed on the operating portion for an external flash to be installed thereon and electrically connected to the first terminal portion; and a connection unit disposed between the operating portion and the mounting portion and supporting the operating portion with respect to the mounting portion in a manner that allows the orientation of the operating portion to be adjusted.

The connection unit may include: a rotation plate disposed to rotate with respect to the mounting portion on a surface of the mounting portion; guide grooves formed in one selected from the group consisting of the rotation plate and the mounting portion to extend in a rotation direction of the rotation plate; and protrusion portions formed on the other one of the group consisting of the rotation plate and the mounting portion to be respectively inserted into the guide grooves.

The adapter may further include a maintaining unit disposed between the rotation plate and the mounting portion and maintaining an orientation of the rotation plate with respect to the mounting portion by applying a pressurizing force to the rotation plate and the mounting portion.

The maintaining unit may include: a plurality of groove portions formed in the mounting portion to be spaced apart from one another in a circumference direction of the mounting portion; a plurality of rolling members inserted into the groove portions and for moving to adjacent groove portions; a cover for covering the rolling members and the groove portions; and a plurality of elastic members disposed between the cover and the rolling members and for applying an elastic force to the rolling members.

The adapter may further include: a plurality of groove portions disposed in one selected from the group consisting of the mounting portion and the operating portion in a circumference direction of the operating portion; and a maintaining unit comprising an elastic plate that comprises a protrusion portion that can be inserted into the groove portions and is disposed in the other of the group consisting of the mounting portion and the operating portion to apply an elastic force to the groove portions.

The first terminal portion and the second terminal portion may be connected to each other via a plurality of wirings for transmitting an electrical signal.

The adapter may further include a circuit board comprising: a plurality of first terminal patterns that contact one selected from the group consisting of the first terminal portion and the second terminal portion and are formed on a first surface of the circuit board; a plurality of second terminal patterns electrically connected to the first terminal patterns and formed on a second surface of the circuit board; and a plurality of third terminal patterns that extend from the second terminal patterns in a circumference direction of the circuit board and contact the other of the group consisting of the first terminal portion and the second terminal portion during rotation of the rotation plate.

The connection unit may rotatably connect the operating portion to the mounting portion in a manner that allows the vertical orientation of the operating portion with respect to the mounting portion to be adjusted.

The adapter may further include a maintaining unit for maintaining the orientation of the operating portion with respect to the mounting portion.

According to an aspect of the invention, there is provided a method including coupling an adapter to a flash terminal of a camera, coupling a flash unit to the adapter, and adjusting the adapter to adjust an angle of the flash unit relative to the camera.

Adjusting the adapter may include rotating a first portion of the adapter relative to a second portion of the adapter.

Adjusting the adapter may include adjusting a left-right angle of the flash unit relative to the camera.

Adjusting the adapter may include adjusting an up-down angle of the flash unit relative to the camera.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Now, exemplary embodiments according to the invention will be described in detail with reference to the accompanying drawings.

Figure 1:
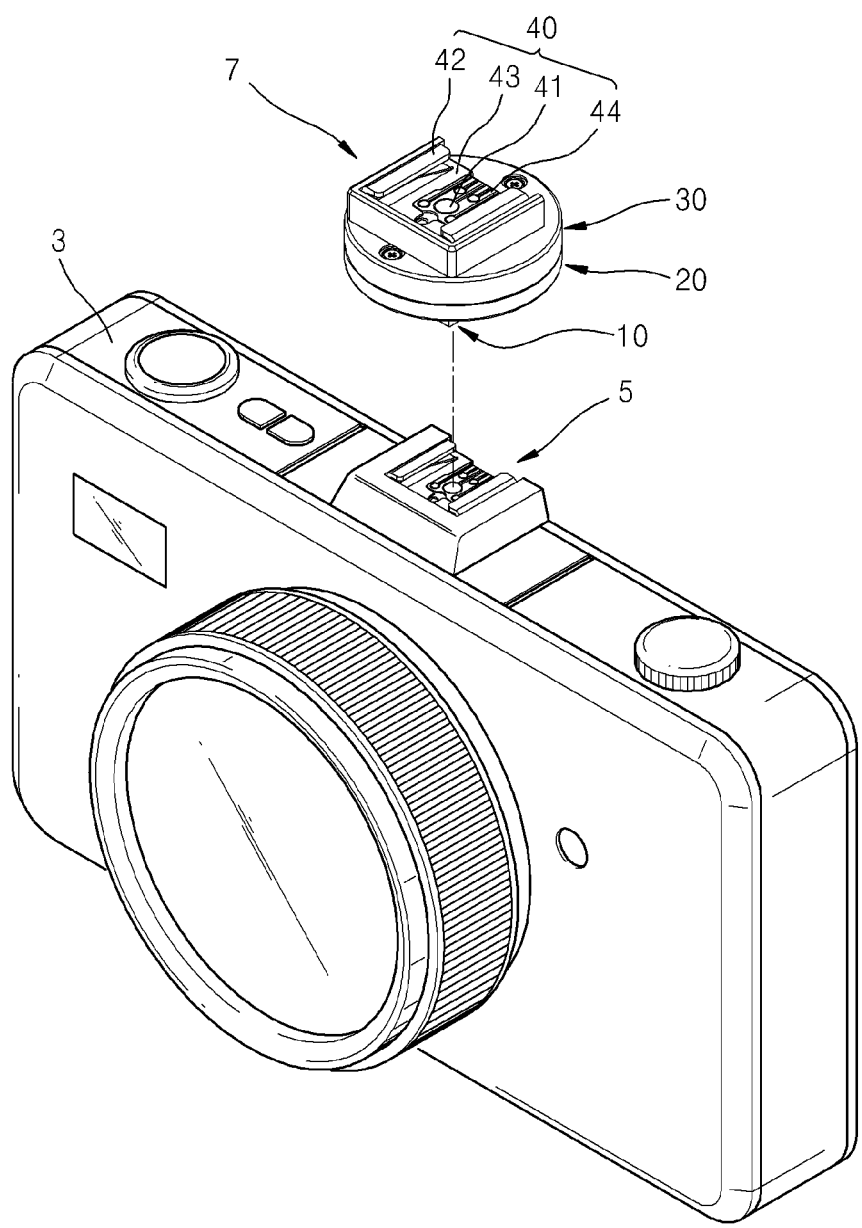
FIG. 1 is a perspective view for explaining coupling between an adapter for a camera flash and a camera, according to an embodiment of the invention.
Figure 2:
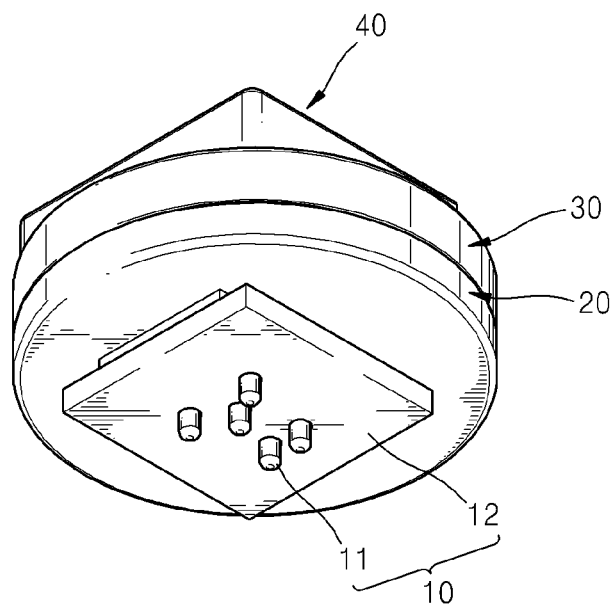
FIG. 2 is a perspective view illustrating a bottom surface of the adapter for a camera flash of FIG. 1.

FIG. 1 is a perspective view for explaining coupling between an adapter 7 for a camera flash and a camera 3, according to an embodiment of the invention. FIG. 2 is a perspective view illustrating a bottom surface of the adapter 7 for a camera flash of FIG. 1.

The adapter 7 for a camera flash includes a first terminal portion 10 corresponding to a flash terminal 5 of the camera 3, a mounting portion 20 supporting the first terminal portion 10 and to be mounted on the camera 3, an operating portion 30 coupled to the mounting portion 20 in a manner that allows an orientation of the operating portion 30 to be adjusted, a second terminal portion 40 disposed on the operating portion 30 and electrically connected to the first terminal portion 10, and a connection unit 50 (see FIG. 4) supporting the operating portion 30 with respect to the mounting portion 20 in a manner that allows the orientation of the operating portion 30 to be adjusted.

The flash terminal 5 of the camera 3, which is also called a hot shoe, is disposed on the camera 3 in order for an external flash to be installed on the camera 3. The adapter 7 for a camera flash may be installed on the flash terminal 5 of the camera 3.

Figure 3:
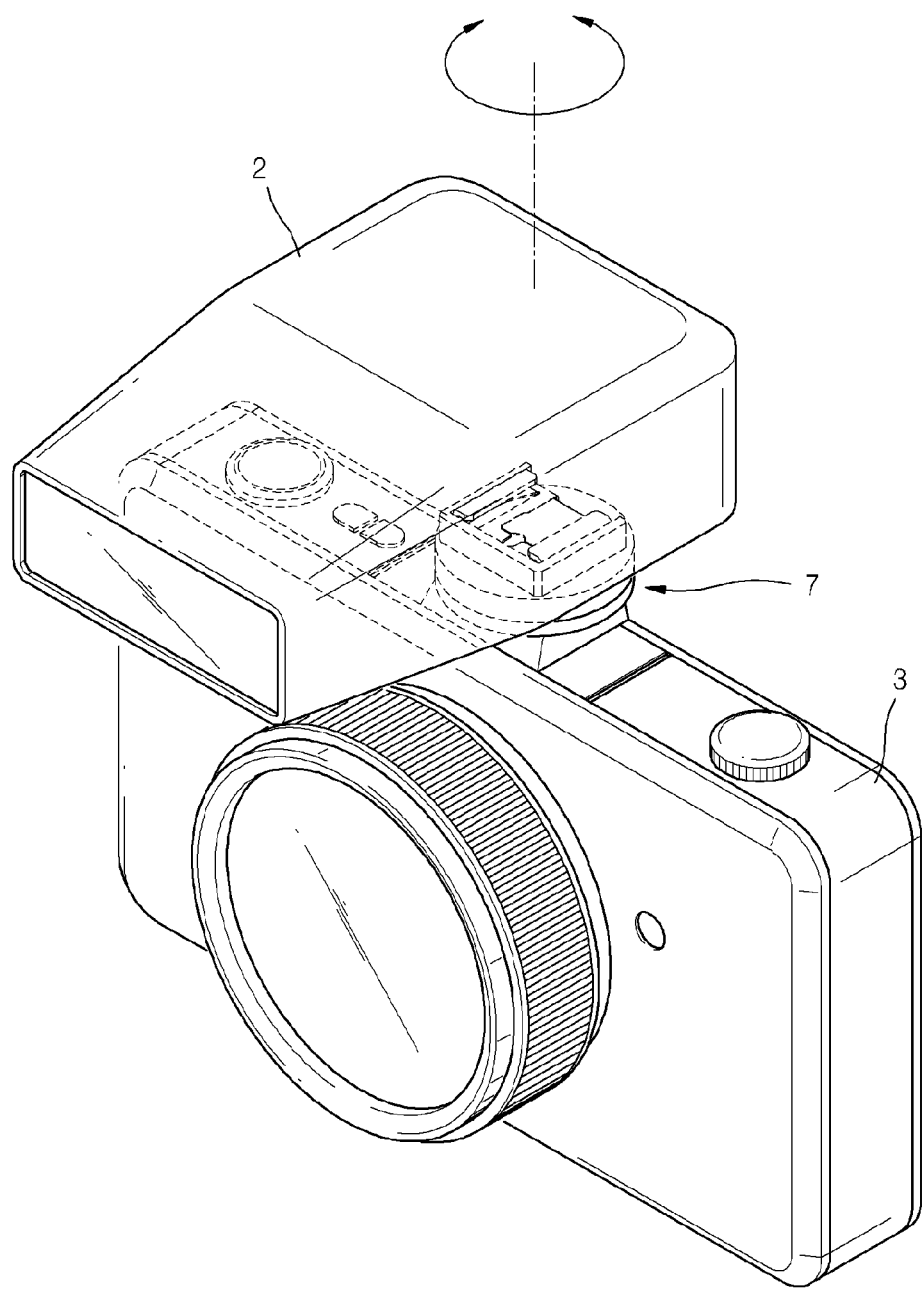
FIG. 3 is a perspective view illustrating the adapter for a camera flash of FIG. 1 installed on a camera.

FIG. 3 is a perspective view illustrating the adapter 7 for a camera flash of FIG. 1 installed on the camera 3.

As shown in FIG. 3, the adapter 7 for a camera flash may be installed on the camera 3, and an external flash 2 may be installed on the adapter 7 for a camera flash. The external flash 2 illustrated in FIG. 3 need not have an angle adjustment function, but may be rotated with respect to the camera 3 by interposing the adapter 7 for a camera flash between the external flash 2 and the camera 3.

Figure 4:
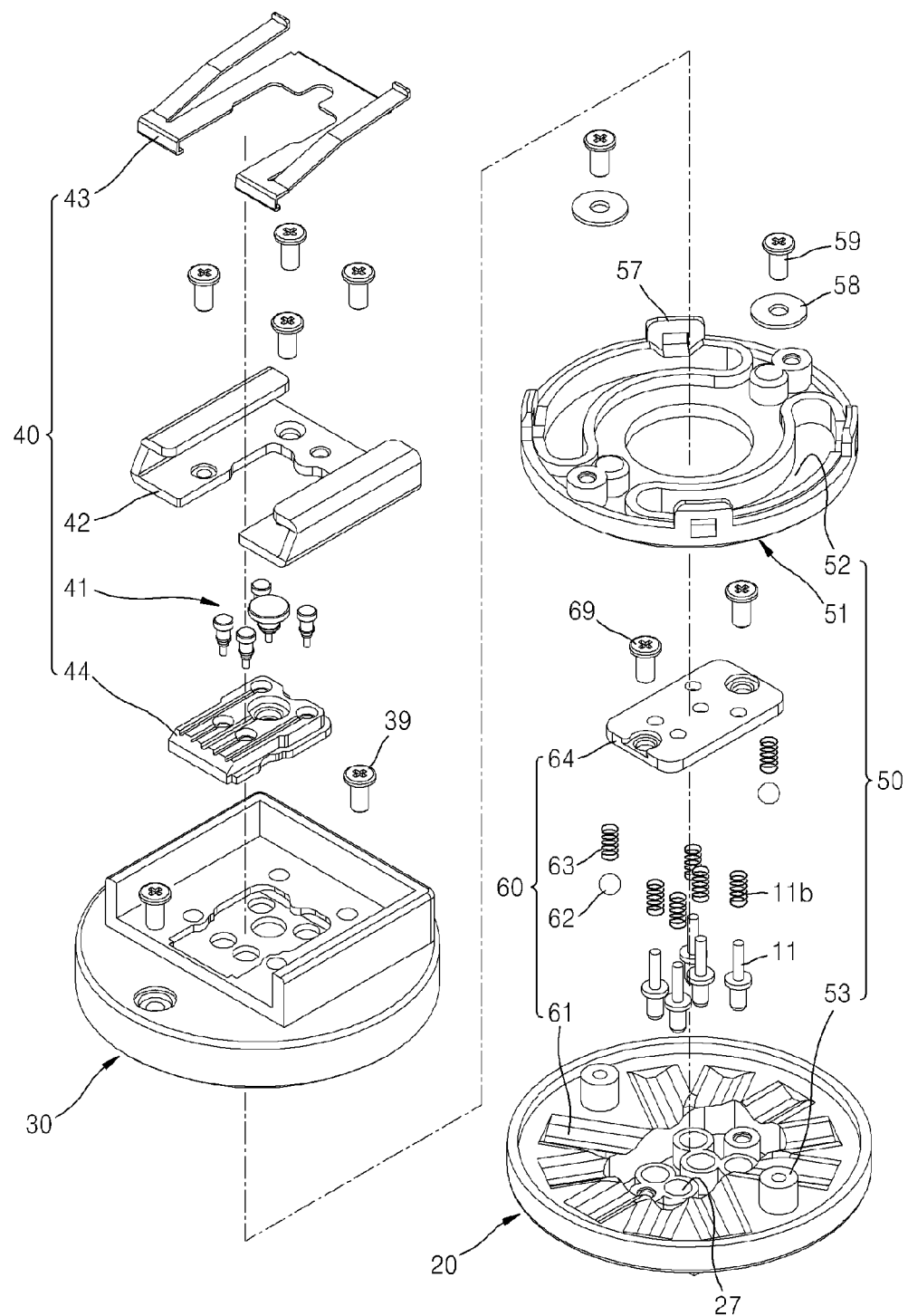
FIG. 4 is a schematic exploded perspective view illustrating components of the adapter for a camera flash of FIG. 1.
Figure 5:
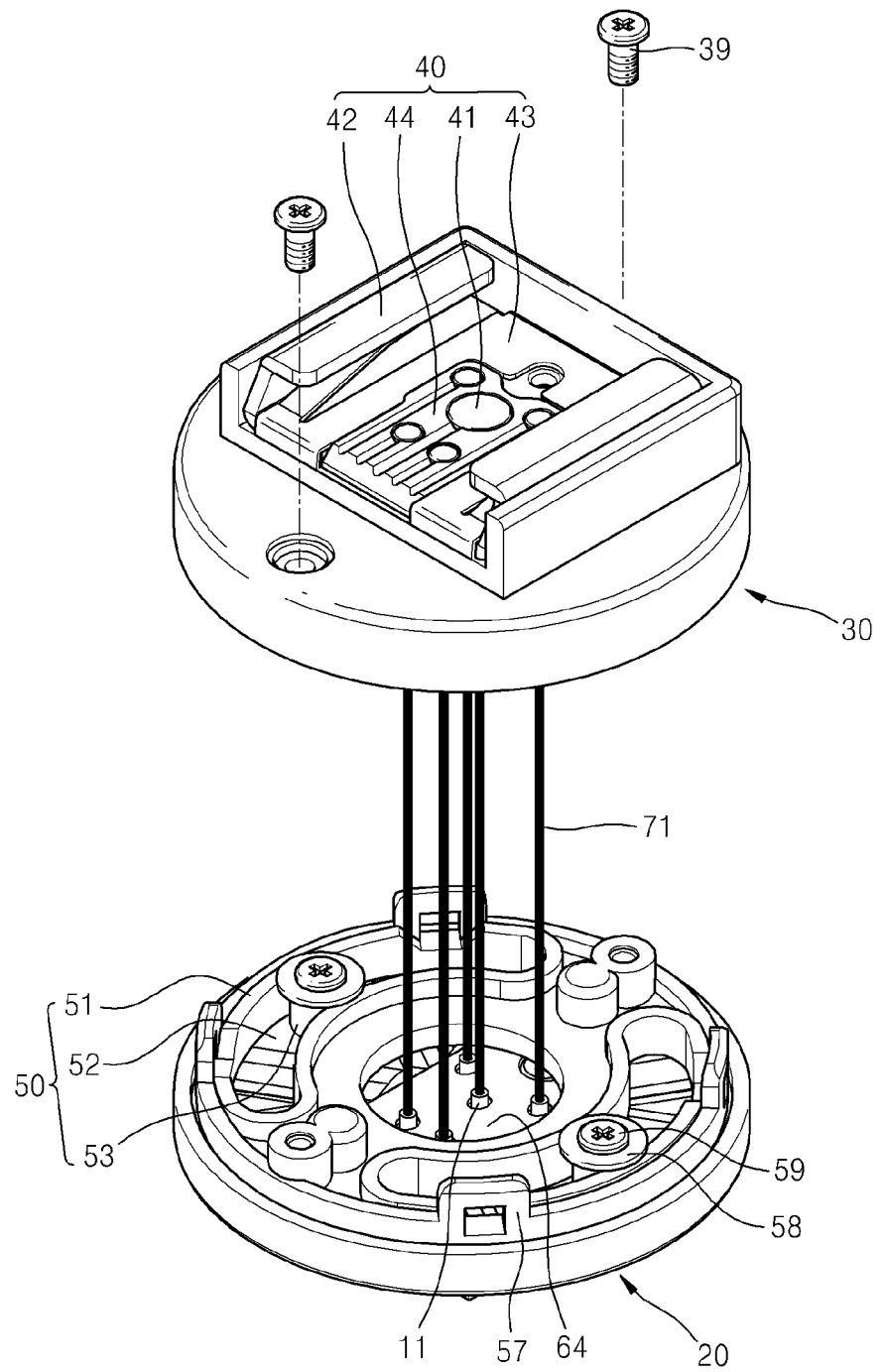
FIG. 5 is a perspective view for explaining a method of coupling the components of FIG. 4.

FIG. 4 is a schematic exploded perspective view illustrating components of the adapter 7 for a camera flash of FIG. 1. FIG. 5 is a perspective view for explaining a method of coupling the components of FIG. 4.

Referring to FIGS. 2 and 4, the first terminal portion 10 may correspond to the flash terminal 5 of the camera 3. The first terminal portion 10 includes a plurality of first terminals 11 that may contact the flash terminal 5 of the camera 3 and a slider 12 that supports the first terminals 11 and is formed to have a shape corresponding to the flash terminal 5.

Each first terminal 11 is formed to have a pin shape of electrically conductive material. The first terminals 11 are respectively inserted into a plurality of holes 27 of the mounting portion 20, and are disposed elastically pressed against the mounting portion 20 by a plurality of springs 11b supported by a cover 64 disposed on the mounting portion 20.

The mounting portion 20 supports the first terminal portion 10 and may be installed on the camera 3. As illustrated in FIG. 3, when the first terminal portion 10 is coupled to the flash terminal 5 of the camera 3, the mounting portion 20 and the camera 3 become coupled.

The operating portion 30 is coupled to the mounting portion 20 in a manner that allows the orientation of the operating portion 30 to be adjusted. In FIGS. 1 through 3, the operating portion 30 is maintained to be approximately flat with respect to the mounting portion 20 and is rotatably coupled to the mounting portion 20.

The second terminal portion 40 on which the external flash 2 (see FIG. 3) may be mounted is disposed on the operating portion 30. The second terminal portion 40 includes a plurality of second terminals 41 electrically connected to the first terminals 11 of the first terminal portion 10, a hot shoe plate 42 for supporting the external flash 2, a spring 43 for applying an elastic force, and a base 44 supporting the second terminals 41.

The connection unit 50 supports the operating portion 30 with respect to the mounting portion 20 in a manner that allows the orientation of the operating portion 30 to be adjusted, and is disposed between the operating portion 30 and the mounting portion 20. The connection unit 50 includes a rotation plate 51 disposed to rotate with respect to the mounting portion 20 on a surface of the mounting portion 20, a plurality of guide grooves 52 formed in the rotation plate 51 to extend in a rotation direction of the rotation plate 51, and a plurality of protrusion portions 53 formed on the mounting portion 20 to protrude toward the rotation plate 51 and to be respectively inserted into the guide grooves 52.

The rotation plate 51 is coupled to the mounting portion 20 by inserting the protrusion portions 53 of the mounting portion 20 into the guide grooves 52 of the rotation plate 51 and then coupling a bolt 59 and a washer 58 to an end of each protrusion portion 53 corresponding to an upper side of the guide grooves 52.

When the rotation plate 51 rotates with respect to the mounting portion 20, the coupling between the protrusion portions 53 and the guide grooves 52 may be stably maintained. The guide grooves 52 and the protrusion portions 53 guide rotation of the rotation plate 51 and also limit a rotation range of the rotation plate 51 with respect to the mounting portion 20.

However, the invention is not limited to the above-described structure of the connection unit 50 including the guide grooves 52 and the protrusion portions 53. For example, the guide grooves 52 may be formed in the mounting portion 20 and the protrusion portions 53 may be formed on the rotation plate 51.

A plurality of locking protrusions 57 formed on an edge of the rotation plate 51 are inserted into the operating portion 30 to couple the rotation plate 51 and the operating portion 30, and the rotation plate 51 is coupled to the operating portion 30 via bolts 39. Thus, the rotation plate 51 and the operating portion 30 may rotate together.

The first terminals 11 of the first terminal portion 10 and the second terminals 41 of the second terminal portion 40 are electrically connected to each other via a plurality of wirings 71 (see FIG. 5) having electrical conductivity. In this regard, the wirings 70 may also refer to electrical connection via a flexible cable having a conductive pattern.

The operating portion 30 may rotate within a predetermined range with respect to the mounting portion 20 by connecting the first terminal portion 10 and the second terminal portion 40 via the wirings 71 having electrical conductivity. If the operating portion 30 is free to continuously rotate, the wirings 71 may be broken. However, as described above, the range in which the operating portion 30 may rotate is determined by ends of the guide grooves 52 due to the guide grooves 52 and the protrusion portions 53.

A maintaining unit 60 for maintaining a rotational orientation of the rotation plate 51 with respect to the mounting portion 20 may be disposed between the rotation plate 51 and the mounting portion 20. The maintaining unit 60 maintains the rotational orientation of the rotation plate 51 by applying a pressurizing force to the rotation plate 51 and the mounting portion 20 to prevent the rotation plate 51 from rotating with respect to the mounting portion 20 before a sufficient rotational force is applied to the maintaining unit 60.

The maintaining unit 60 includes a plurality of groove portions 61 formed in the mounting portion 20 and spaced apart from one another in a circumference direction of the mounting portion 20, a plurality of rolling members 62 that are inserted into the groove portions 61 and may move to adjacent groove portions 61, the cover 64 for covering the rolling members 62 and the groove portions 61, and a plurality of elastic members 63 disposed between the cover 64 and the rolling members 62 and for applying an elastic force to the rolling members 62.

Although balls are used as the rolling members 62 in the invention, any of various other members having a shape capable of rolling and moving to adjacent groove portions 61 may be used. The rolling members 62 are elastically supported by the elastic members 63 and are inserted into the groove portions 61, and, thus, one rolling member 62 inserted into one groove portion 61 may not move to an adjacent groove portion 61 by a force smaller than an elastic force of the elastic members 63.

If a force applied to the rotation plate 51 when the operating portion 30 is rotated by a user is greater than a pressurizing force applied by the maintaining unit 60, the rolling members 62 move to adjacent groove portions 61 while pressing against the elastic members 63. Thus, the orientation of the operating portion 30 with respect to the mounting portion 20 may be sequentially adjusted due to the maintaining unit 60.

Angles of left and right directions of the external flash 2 may be adjusted due to rotation of the external flash 2 installed on the camera 3 via the adapter 7 for a camera flash illustrated in FIGS. 1 through 5. As such, using the adapter 7 for a camera flash, which is made compact, a convenient function may be realized without using an expensive heavy external flash having a rotation function.

Figure 6:
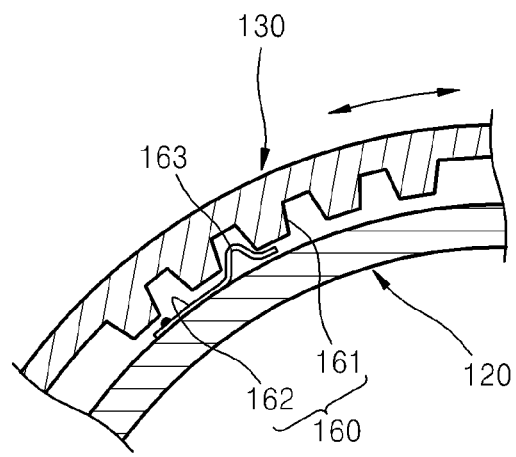
FIG. 6 is a cross-sectional view illustrating a portion of an adapter for a camera flash, according to another embodiment of the invention.

FIG. 6 is a cross-sectional view illustrating a portion of an adapter for a camera flash, according to another embodiment of the invention.

A configuration of the adapter for a camera flash of FIG. 6 is similar to that of the adapter 7 for a camera flash of FIGS. 1 through 5. The adapter for a camera flash illustrated in FIG. 6 includes a mounting portion 120 installed on a camera, an operating portion 130 rotatably coupled to the mounting portion 120, and a maintaining unit 160 disposed between the mounting portion 120 and the operating portion 130 and for applying a pressurizing force to the mounting portion 120 and the operating portion 130 to maintain an orientation of the operating portion 130.

The maintaining unit 160 includes a plurality of groove portions 161 formed in an inner wall of the operating portion 130 in a circumference direction of the operating portion 130, and an elastic plate 162 that includes a protrusion portion 163 that is disposed on an outer surface of the mounting portion 120 and that may be inserted into one groove portion 161 to apply an elastic force to the groove portion 161.

Thus, the orientation of the operating portion 130 with respect to the mounting portion 120 may be maintained due to the elastic plate 162. If a force greater than a pressurizing force due to the elastic plate 162 is applied to the operating portion 130, the protrusion portion 163 moves to adjacent groove portions 161, and, thus, a relative orientation of the operating portion 130 with respect to the mounting portion 120 may be adjusted.

Figure 7:
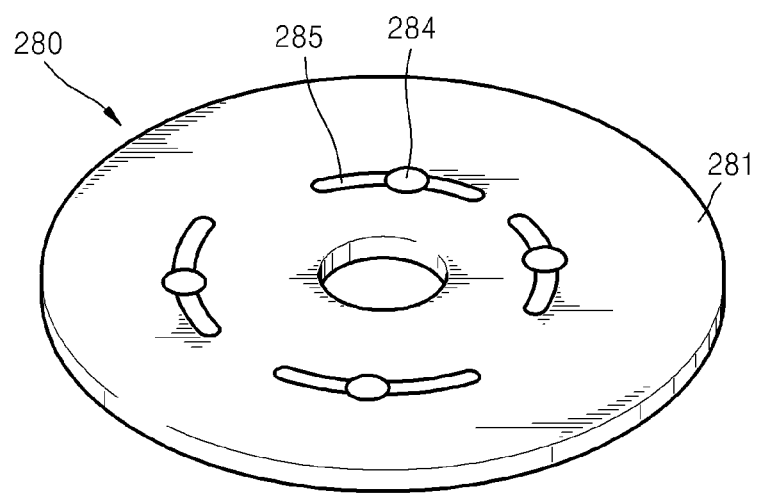
FIG. 7 is a perspective view illustrating a component of an adapter for a camera flash, according to another embodiment of the invention.
Figure 8:
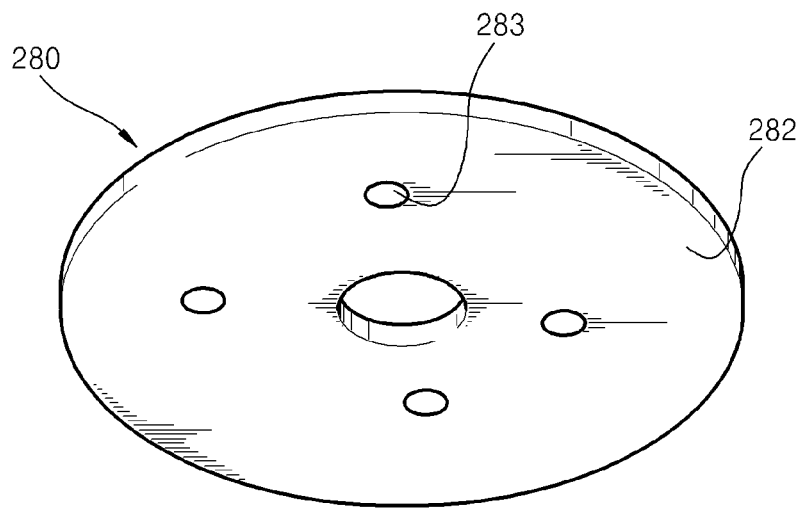
FIG. 8 is a bottom view of the component of FIG. 7.

FIG. 7 is a perspective view illustrating a component of an adapter for a camera flash, according to another embodiment of the invention. FIG. 8 is a bottom view of the component of FIG. 7.

FIG. 7 illustrates a circuit board 280 that may be used to electrically connect the first terminal portion 10 and the second terminal portion 40 in the adapter 7 for a camera flash illustrated in FIGS. 1 through 5.

The circuit board 280 may be disposed between the mounting portion 20 and the operating portion 30. In detail, if the current embodiment is applied to the embodiment illustrated in FIG. 4, the circuit board 280 may be disposed between the rotation plate 51 and the mounting portion 20.

Referring to FIG. 8, a plurality of first terminal patterns 283 corresponding to the first terminals 11 of the first terminal portion 10 installed on the mounting portion 20 are formed on a first surface 282 of the circuit board 280.

Referring to FIG. 7, a plurality of second terminal patterns 284 corresponding to the second terminals 41 of the second terminal portion 40 installed on the operating portion 30 and a plurality of third terminal patterns 285 extending from the second terminal patterns 284 in a circumference direction of the circuit board 280 are formed on a second surface 281 of the circuit board 280.

The circuit board 280 is formed to be fixed to the mounting portion 20, and, thus, contact between the first terminal patterns 283 and the first terminals 11 is always maintained. The second terminal patterns 284 and the third terminal patterns 285 of the circuit board 280 contact the second terminals 41 even while the operating portion 30 rotates with respect to the mounting portion 20.

Using the circuit board 280 having the above-described structure, an operation for electrically connecting the first terminal portion 10 and the second terminal portion 40 may be easily performed. Also, even when the operating portion 30 rotates with respect to the mounting portion 20, the electrical connection between the first terminal portion 10 and the second terminal portion 40 may be stably maintained.

Figure 9:
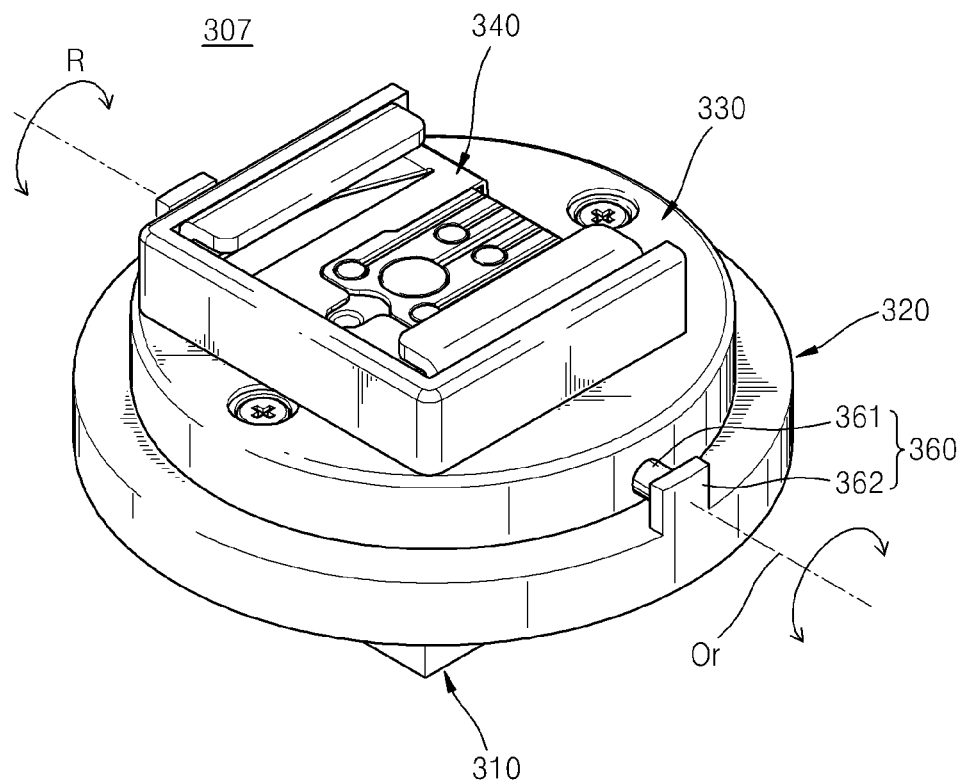
FIG. 9 is a perspective view illustrating an adapter for a camera flash, according to another embodiment of the invention.
Figure 10:
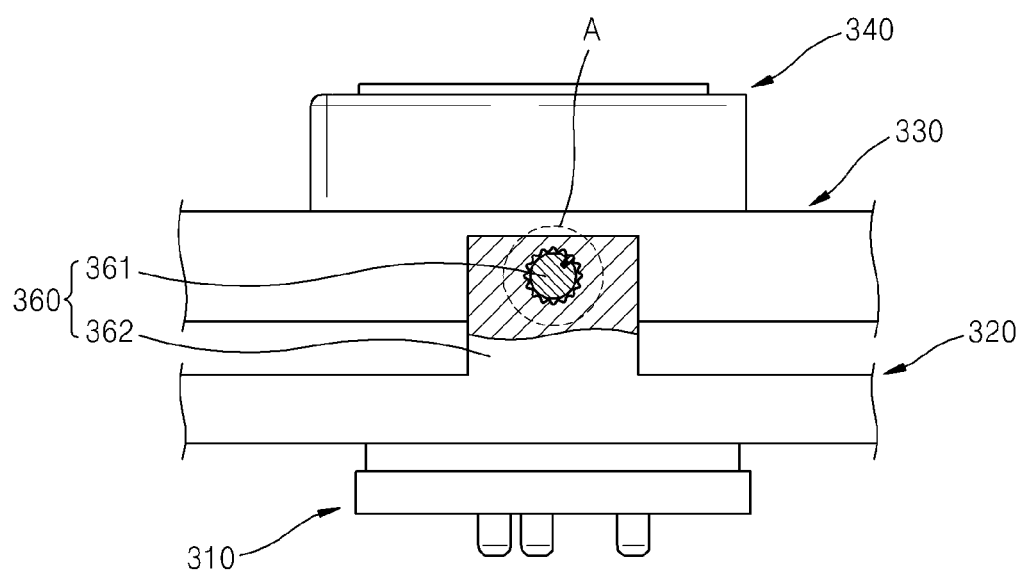
FIG. 10 is a cross-sectional side view of the adapter for a camera flash of FIG. 9.
Figure 11:
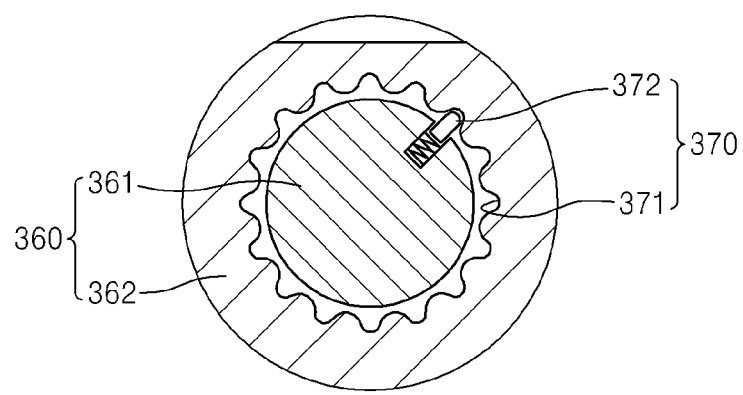
FIG. 11 is an enlarged view of a portion A of FIG. 10.

FIG. 9 is a perspective view illustrating an adapter 307 for a camera flash, according to another embodiment of the invention. FIG. 10 is a cross-sectional side view of the adapter 307 of FIG. 9. FIG. 11 is an enlarged view of a portion A of FIG. 10.

The adapter 307 for a camera flash illustrated in FIGS. 9 and 10 includes a first terminal portion 310 corresponding to a flash terminal of a camera, a mounting portion 320 supporting the first terminal portion 310 and coupled to the camera, an operating portion 330 coupled to the mounting portion 320 in a manner that allows an orientation of the operating portion 330 to be adjusted, a second terminal portion 340 disposed on the operating portion 330 and electrically connected to the first terminal portion 310, and a connection unit 360 supporting the operating portion 330 with respect to the mounting portion 320 in a manner that allows the orientation of the operating portion 330 to be adjusted.

The connection unit 360 supports the operating portion 330 in a manner that allows the operating portion 330 to rotate with respect to the mounting portion 320 around an axis Or that is approximately parallel to an extension direction of the operating portion 330.

The connection unit 360 includes a rotation axis 361 protruding from an edge of the operating portion 330, and a supporting block 362 formed at an edge of the mounting portion 320 to rotatably support the rotation axis 361. The rotation axis 361 may rotate while the rotation axis 361 is inserted into the supporting block 362, and, thus, the operating portion 330 may rotate with respect to the mounting portion 320 as indicated by an arrow R of FIG. 9. Therefore, when an external flash is installed on the second terminal portion 340, an emission direction of the installed external flash may be adjusted in a vertical direction with respect to the camera.

Referring to FIG. 11, a maintaining unit 370 for maintaining an orientation of the operating portion 330 with respect to the mounting portion 320 is formed in the connection unit 360. The maintaining unit 370 includes a plurality of groove portions 371 surrounding the rotation axis 361 and spaced apart from one another, and a protrusion portion 372 elastically disposed to protrude from an outer surface of the rotation axis 361.

The protrusion portion 372 may be supported by, for example, a spring, and may be inserted into the rotation axis 361. An outer end portion of the protrusion portion 372 is maintained inserted into one groove portion 371 and, thus, the orientation of the rotation axis 361 with respect to the supporting block 362 may be maintained.

When the external flash is installed on the camera, if a user applies a force to the external flash to rotate the external flash with respect to the rotation axis 361, the protrusion portion 372 of the maintaining unit 370 moves to an adjacent groove portion 371. Thus, an orientation of the external flash with respect to the camera may be adjusted in the vertical direction.

According to the above-described adapters for a camera flash, an operating portion is coupled to a mounting portion by a connection unit in a manner that allows an orientation of the operating portion to be adjusted, and, thus, an emission angle of a flash installed on a camera may be adjusted. Thus, even when a flash that does not having an angle adjusting function is used; an orientation of the flash may be freely adjusted. Also, using the adapters for a camera flash, which are made compact and have simple configurations, inconvenience due to using of a flash that is expensive and large may be solved.

The devices described herein may comprise a memory for storing program data, a processor for executing the program data, a permanent storage such as a disk drive, a communications port for handling communications with external devices, and user interface devices, such as a touch panel, keys, buttons, etc. When software modules or algorithms are involved, these software modules may be stored as program instructions or computer-readable codes executable by the processor on a computer-readable medium. Examples of the computer-readable storage medium are a magnetic storage media (e.g., a read-only memory (ROM), a floppy disk, and a hard disk, etc.), and an optical storage media (e.g., a compact disc (CD), a digital versatile disc (DVD), etc.). The computer-readable storage medium can also be distributed over network-coupled computer systems so that the computer-readable code is stored and executed in a distributed fashion. These media can be read by a computer, stored in the memory, and executed by the processor.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosed embodiments, reference has been made to the embodiments illustrated in the drawings, and specific language has been used to describe these embodiments. However, no limitation of the scope of this disclosure is intended by this specific language, and the claimed inventions should be construed to encompass all embodiments that would normally occur to one of ordinary skill in the art. The terminology used herein is for the purpose of describing the particular embodiments and is not intended to be limiting the embodiments of this patent.

The use of any and all examples, or exemplary language (e.g., "such as") provided herein, is intended merely to better illuminate the claimed inventions and does not pose a limitation on the scope of the claimed inventions unless otherwise claimed. Numerous modifications and adaptations will be readily apparent to those of ordinary skill in this art without departing from the spirit and scope of the claimed inventions. Therefore, the scope of the claimed inventions is defined not by the detailed description but includes all equivalents and differences within the scope of the present disclosure.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An adapter for a camera flash comprising:
a first terminal portion corresponding to a flash terminal of a camera;
a mounting portion supporting the first terminal portion and being installable on the camera;
an operating portion coupled to the mounting portion in a manner that allows an orientation of the operating portion to be adjusted;
a second terminal portion disposed on the operating portion for an external flash to be installed thereon and electrically connected to the first terminal portion; and
a connection unit disposed between the operating portion and the mounting portion and supporting the operating portion with respect to the mounting portion in a manner that allows the orientation of the operating portion to be adjusted;
wherein the connection unit comprises:
a rotation plate disposed to rotate with respect to the mounting portion on a surface of the mounting portion;
guide grooves formed in one selected from the group consisting of the rotation plate and the mounting portion to extend in a rotation direction of the rotation plate; and protrusion portions formed on the other one of the group consisting of the rotation plate and the mounting portion to be respectively inserted into the guide grooves.

2. The adapter of claim 1, further comprising a maintaining unit disposed between the rotation plate and the mounting portion and maintaining an orientation of the rotation plate with respect to the mounting portion by applying a pressurizing force to the rotation plate and the mounting portion.

3. The adapter of claim 2, wherein the maintaining unit comprises:
a plurality of groove portions formed in the mounting portion to be spaced apart from one another in a circumference direction of the mounting portion;
a plurality of rolling members inserted into the groove portions and for moving to adjacent groove portions;
a cover for covering the rolling members and the groove portions; and
a plurality of elastic members disposed between the cover and the rolling members and for applying an elastic force to the rolling members.

4. The adapter of claim 1, further comprising:
a plurality of groove portions disposed in one selected from the group consisting of the mounting portion and the operating portion in a circumference direction of the operating portion; and
a maintaining unit comprising an elastic plate that comprises a protrusion portion that can be inserted into the groove portions and is disposed in the other of the group consisting of the mounting portion and the operating portion to apply an elastic force to the groove portions.

5. The adapter of claim 1, wherein the first terminal portion and the second terminal portion are connected to each other via a plurality of wirings for transmitting an electrical signal.

6. The adapter of claim 1, wherein the connection unit rotatably connects the operating portion to the mounting portion in a manner that allows the vertical orientation of the operating portion with respect to the mounting portion to be adjusted.

7. The adapter of claim 6, further comprising a maintaining unit for maintaining the orientation of the operating portion with respect to the mounting portion.

8. An adapter for a camera flash comprising;
a first terminal portion corresponding to a flash terminal of a camera;
a mounting portion supporting the first terminal portion and being installable on the camera;
an operating portion coupled to the mounting portion in a manner that allows an orientation of the operating portion to be adjusted;
a second terminal portion disposed on the operating portion for an external flash to be installed thereon and electrically connected to the first terminal portion;
a connection unit disposed between the operating portion and the mounting portion and supporting the operating portion with respect to the mounting portion in a manner that allows the orientation of the operating portion to be adjusted; and
a circuit board comprising:
a plurality of first terminal patterns that contact one selected from the group consisting of the first terminal portion and the second terminal portion and are formed on a first surface of the circuit board;
a plurality of second terminal patterns electrically connected to the first terminal patterns and formed on a second surface of the circuit board; and
a plurality of third terminal patterns that extend from the second terminal patterns in a circumference direction of the circuit board and contact the other of the group consisting of the first terminal portion and the second terminal portion during rotation of the rotation plate.

9. A method comprising:
providing an adapter for a camera flash comprising:
a first terminal portion corresponding to a flash terminal of a camera;
a mounting portion supporting the first terminal portion and being installable on the camera;
an operating portion coupled to the mounting portion in a manner that allows an orientation of the operating portion to be adjusted;
a second terminal portion disposed on the operating portion for an external flash to be installed thereon and electrically connected to the first terminal portion; and
a connection unit disposed between the operating portion and the mounting portion and supporting the operating portion with respect to the mounting portion in a manner that allows the orientation of the operating portion to be adjusted;
wherein the connection unit comprises:
a rotation plate disposed to rotate with respect to the mounting portion on a surface of the mounting portion;
guide grooves formed in one selected from the group consisting of the rotation plate and the mounting portion to extend in a rotation direction of the rotation plate; and
protrusion portions formed on the other one of the group consisting of the rotation plate and the mounting portion to be respectively inserted into the guide grooves;
coupling the first terminal portion to a flash terminal of a camera;
coupling a flash unit to the second terminal portion; and
adjusting the adapter to adjust an angle of the flash unit relative to the camera.

10. The method of claim 9, wherein adjusting the adapter comprises rotating a first portion of the adapter relative to a second portion of the adapter.

11. The method of claim 9, wherein adjusting the adapter comprises adjusting a left-right angle of the flash unit relative to the camera.

12. The method of claim 9, wherein adjusting the adapter comprises adjusting an up-down angle of the flash unit relative to the camera.

* * * * *